United States Patent [19]

Stone et al.

[11] 3,844,031

[45] Oct. 29, 1974

[54] METHOD OF MOUNTING AND FORMING DYNAMOELECTRIC MACHINE COMPONENTS

[75] Inventors: William M. Stone; John M. Brunschwig; Kenneth J. Zurbuch, all of Dekalb, Ill.

[73] Assignee: General Electric Company, Fort Wayne, Ind.

[22] Filed: Aug. 15, 1973

[21] Appl. No.: 388,672

[52] U.S. Cl............ 29/596, 29/156.8 CF, 29/430, 310/42, 310/63
[51] Int. Cl............................................. H02k 15/00
[58] Field of Search...... 29/596, 598, 205 R, 205 D, 29/430, 156.8 CF; 310/42, 60, 61, 62, 63, 58, 89

[56] References Cited
UNITED STATES PATENTS

| | | | |
|---|---|---|---|
| 1,734,541 | 11/1929 | Tedman | 29/156.8 CF |
| 2,970,234 | 1/1961 | Erickson | 310/63 |
| 3,243,617 | 3/1966 | Cunningham | 310/63 |
| 3,527,970 | 9/1970 | Wightman et al. | 310/63 |
| 3,643,119 | 2/1972 | Lukens | 310/60 |

*Primary Examiner*—C. W. Lanham
*Assistant Examiner*—Carl E. Hall

[57] ABSTRACT

A method of forming and mounting a fan for use in cooling an annular group of stator winding end turns in a dynamoelectric machine. The method comprises the steps of forming in an annulus a plurality of cooling means which remain disposed generally in the plane of the annulus, and the annulus is then secured to an end ring of a rotatable assembly for the dynamoelectric machine. Thereafter, the cooling means is deformed from the plane of the annulus to extend over the outer periphery of the stator end turns. The method of making a dynamoelectric machine and the method of effecting improved concentricity of a fan in the manufacture of a dynamoelectric machine are also disclosed.

55 Claims, 8 Drawing Figures

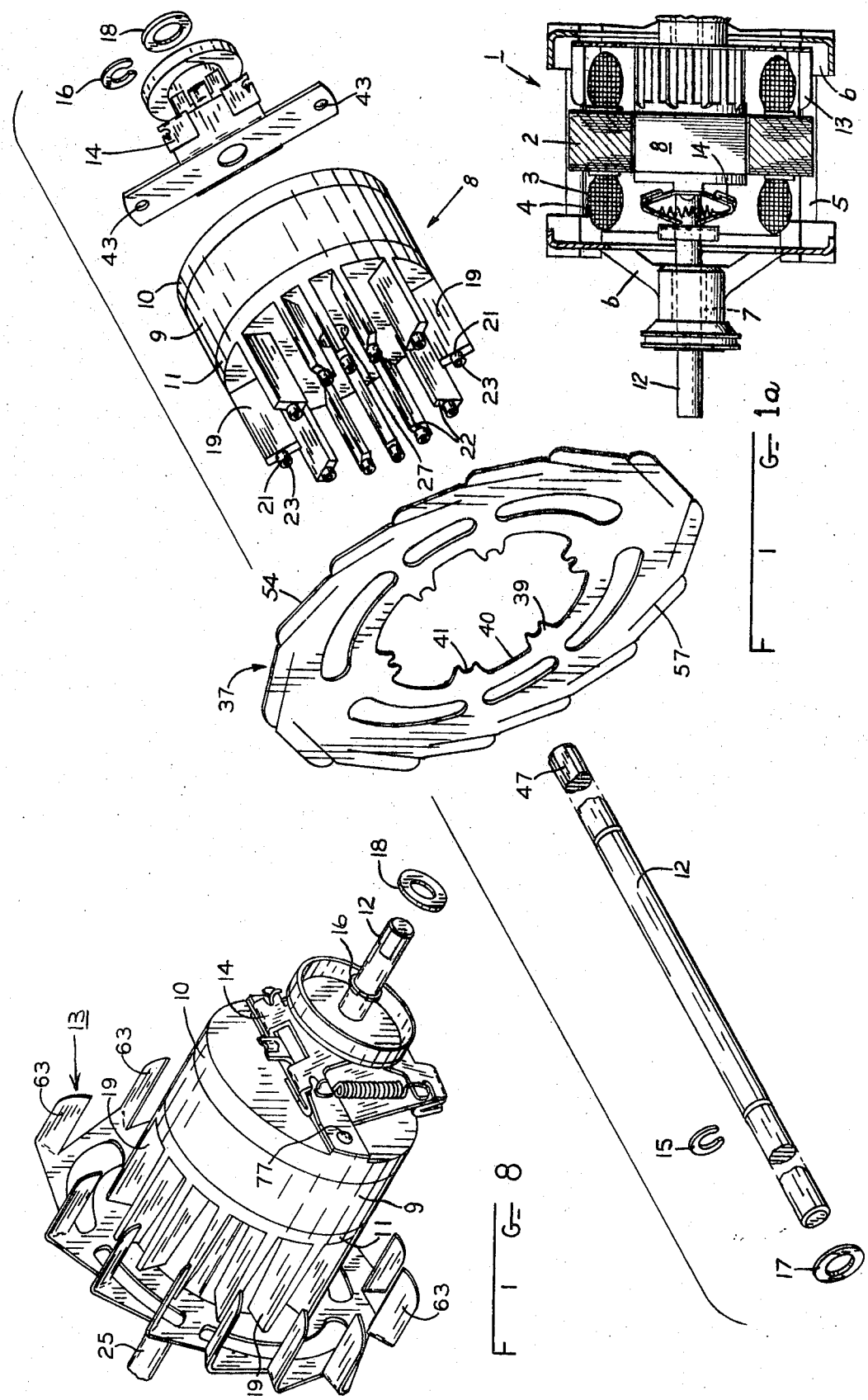

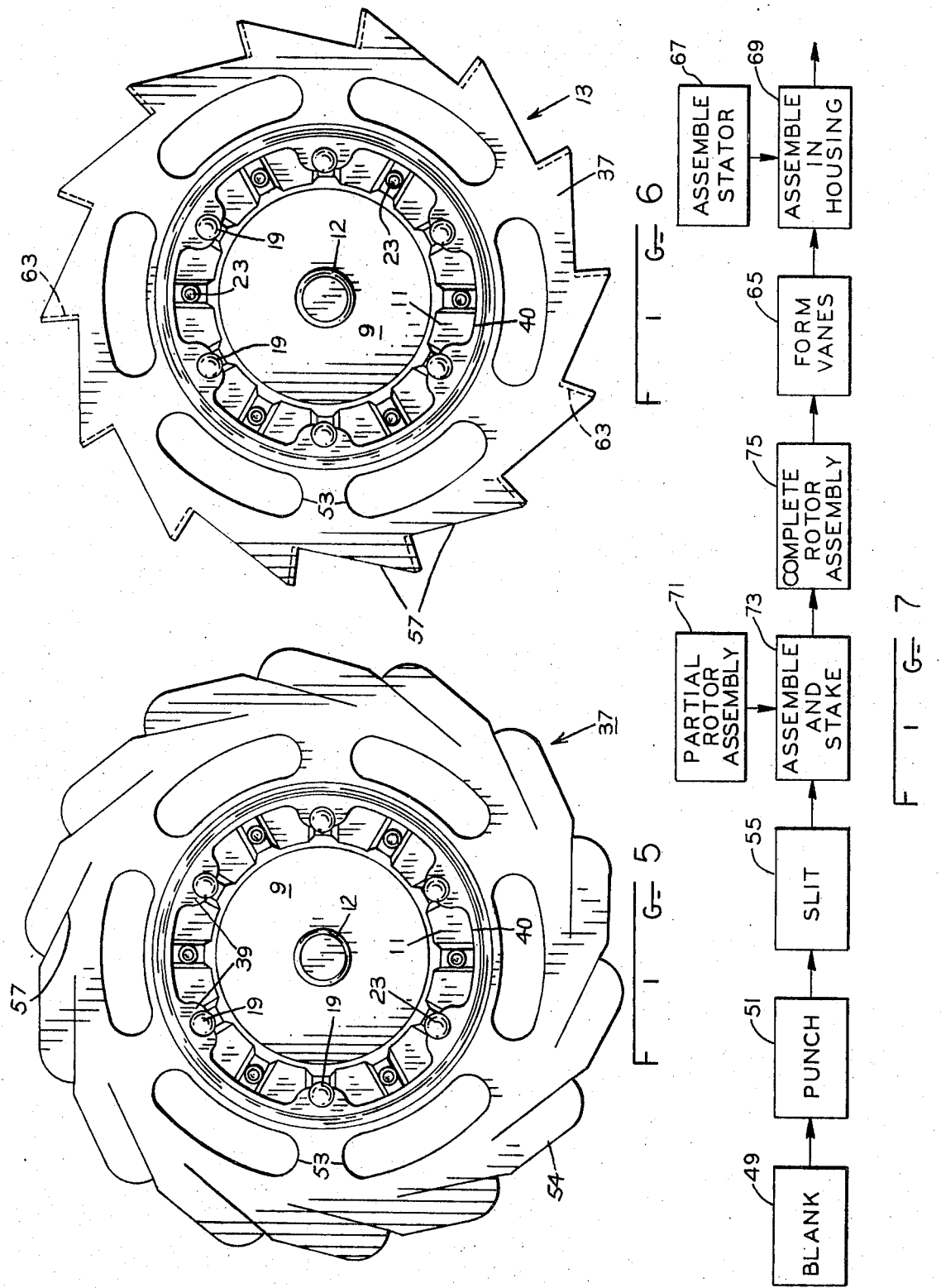

METHOD OF MOUNTING AND FORMING DYNAMOELECTRIC MACHINE COMPONENTS

CROSS REFERENCE TO RELATED APPLICATIONS

Copending application Ser. No. 388,302 entitled: DYNAMOELECTRIC MACHINE ROTOR ASSEMBLY DEVICE and filed on the same day as this application is a related application. Copending application Ser. No. 246,455 entitled: DYNAMOELECTRIC MACHINE AND METHOD OF FORMING AND MOUNTING A COMPONENT THEREOF, and filed Apr. 21, 1972, now abandoned, is also a related application.

BACKGROUND OF THE INVENTION

This invention relates to dynamoelectric machines and more particularly to methods of making them and of mounting and forming a component thereof.

As is well-known in the dynamoelectric machine art, most electric motors and generators comprise a stationary member, generally referred to as a stator, in which a rotatable assembly, generally referred to as a rotor, is rotatably mounted. Typically, the stator comprises a laminated magnetic core having a cylindrical bore in which the rotor is received, and a plurality of winding receiving slots communicating longitudinally through the core between two core faces. Electrically energizable windings pass through the slots, which windings include end turns that pass between slots adjacent each of the two core faces to collectively form two annular groupings of winding end turns. Normally, the stator also comprises two end frames or a housing secured to the core in spaced relation therewith and with the annular grouping of winding end turns disposed therebetween. A bearing is typically carried by each of the end shields through which bearing the rotor drive shaft is journalled.

During operation of dynamoelectric machines of the type just described, the temperature of the stator windings may become sufficiently elevated to render the inclusion of air cooling means, such as fans, desirable for efficient machine operation and longevity. Heretofore, as exemplified by U.S. Pat. No. 3,243,617 to Cunningham, this has been accomplished by provision of circularly disposed integral fan blades or vanes projecting from one end of the rotor assembly concentrically within the annular grouping of winding end turns. Sets of arcuate vanes are riveted or staked to the other end of the rotor assembly, which vanes project out from within an annular grouping of end turns closely adjacent the end of the grouping which end extends generally radially of the rotor shaft.

More recently a group of patents have issued, singularly and jointly, to Lawrance W. Wightman, namely U.S. Pat. Nos. 3,518,468, 3,518,471, 3,527,970, 3,538,598, 3,544,820, and 3,610,976. In these patents dynamoelectric machines are also shown having the aforementioned circularly disposed integral fan vanes projecting from the rotor ends coaxially of the rotor shaft. To two planar ends of these vanes, two annuluses are secured, respectively, by a set of screws, facing the ends of the annular grouping of end turns. Fan vanes are formed with concave surfaces provided in the annulus to rotate adjacent the ends of the turns upon rotation of the rotor.

These patents involve individual mounting of the fan blades to an annulus using screws and individually tapped holes in the annulus, an unnecessary axial elongation of the machine, and an inhibition of the free flow of air around the winding end turns. Deployment in a particulate environment such as clothes dryers, has led to the further problem of lint blocking the air flow.

The disadvantageous features of the past motor fans have been overcome by the apparatus and method disclosed in the copending Pat. application Ser. No. 246,455, the entire subject matter of which is specifically incorporated herein by reference. Very briefly, the copending patent application discloses a dynamoelectric machine having a rotor supported fan for cooling an annular group of stator winding end turns comprising an annular fan attached to rotor vanes and having an outer peripheral edge adjacent a set of fan vanes which are bent over to extend about the outer periphery of the annular grouping of end turns. Such an annular fan arrangement provides good cooling and air flow, is not particularly troubled by a particulate environment, and maintains the overall axial machine dimension within desired limits.

In addition to the foregoing, other disadvantageous features were encountered in the production or manufacturing stages of the past motor fans. For example, in past productions annular fans were produced by progressive dies which blank, punch, slit and form the fan from a strip of relatively thin sheet metal after which the fans are, for example, galvanized or given a zinc coating and then stored for subsequent attachment to a motor rotor. During plating and storing, the already formed vanes or blades of the fan become entangled with other vanes and were difficult to untangle thus not only causing storage problems but also wasting percious time at the production line. Further, the above-mentioned entanglement along with other handling and production problems made it difficult to maintain the desired tolerances of inside and outside diameters of the past fans. Thus, when staked to the rotor, the concentricity of the past vanes relative to the rotor were often without tolerance limits, and in extreme situations, the vanes of the past fans struck the end turns or the motor housing when turning.

A principle object of the present invention is to provide a method of forming and mounting a fan for use in cooling stator winding end turns in a dynamoelectric machine, a method of making a dynamoelectric machine, and a method of effecting improved concentricity of a fan in the manufacture of a dynamoelectric machine which overcome the disadvantageous features of the past methods; and this, as well as other objects and advantageous features of the present invention, will be in part apparent and in part pointed out in the specification which follows.

SUMMARY OF THE INVENTION

In general, a method in one form of this invention of forming and mounting a fan for use in cooling an annular group of stator winding and turns in a dynamoelectric machine comprises forming in an annulus adjacent the outer edge thereof a plurality of cooling means which remain disposed generally in the plane of the annulus. The annulus is secured to an end ring of a rotatable assembly for the dynamoelectric machine, and the cooling means are then deformed from the plane of the annulus to extend generally over the outer periphery of the annular group of stator winding end turns which may be disposed adjacent the cooling means.

In another method in one form of this invention of making a dynamoelectric machine, a generally flat fan stamping is formed and mounted to one end of an at least partially completed rotatable assembly with the axis thereof extending generally normal to the plane of the stamping, and portions of the stamping are thereafter bent away from the plane thereof. The rotatable assembly with the fabricated fan attached is then inserted onto a bore of a stator and supported for rotation therein.

In still another method in one form of the invention for making a dyamoelectric machine, a generally planar member of sheet material is attached to a rotatable assembly for the dynamoelectric machine, and portions of the attached member are deformed thereby to form fan vanes extending away from the plane of the member and disposed generally concentrically about the axis of the rotatable assembly which is thereafter supported for rotation within a wound stator.

In the manufacture of a dynamoelectric machine having a fan attached to and rotatable with a rotatable assembly about its axis in the machine, the method in one form of this invention of effecting improved concentricity of the fan about the axis of the rotatable assembly is achieved by locating a generally planar, annular fan member on an end of the rotatable assembly in a located position generally concentric with and perpendicular to the axis of the rotatable assembly. Thereafter, the member is secured in its located position to the end of the rotatable assembly, and a plurality of fan vanes are then deformed from the plane of the member adjacent its outer peripheral edge to positions extending generally perpendicular to the plane of the member while said member is in its located position.

BRIEF DESCRIPTION OF THE DRAWING

FIG. 1 is a cross-sectional view of a dynamoelectric machine embodied in this invention.

FIG. 1a is an enlarged, exploded perspective view of the rotatable assembly of FIG. 1;

FIG. 5 is a plan view of the fan of FIG. 4 attached to the rotatable assembly;

FIG. 6 is a plan view of the fan of FIG. 5 after formation of a plurality of vanes;

FIG. 7 is a functional flow diagram illustrating a variation on the assembly process of FIG. 2 and which is also embodied in the present invention; and FIG. 8 is a perspective view of a completed rotatable assembly with the fan vanes formed and centrifugal switch in place.

Figure 3:
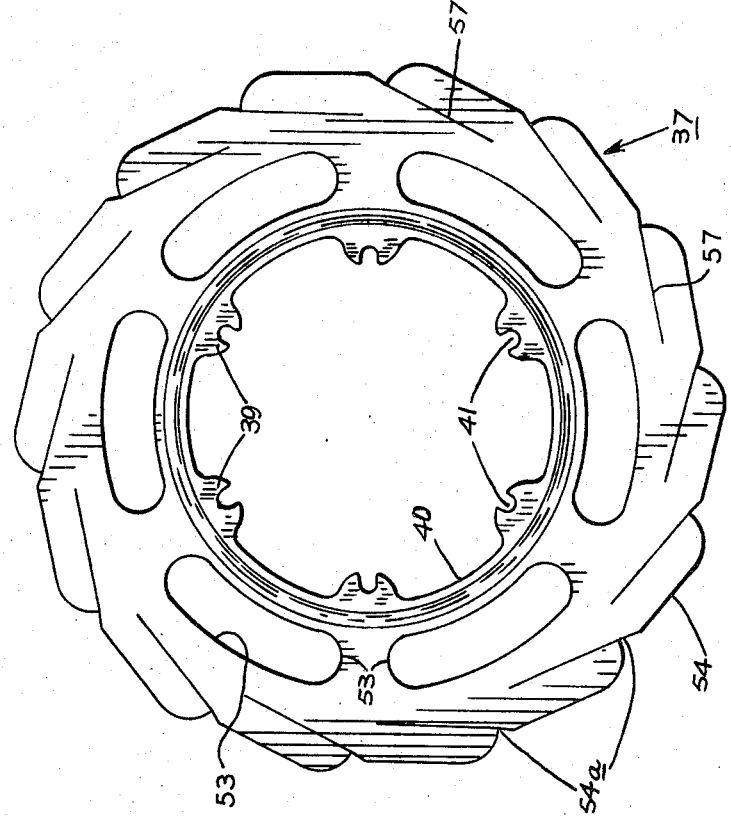
FIG. 3 is plan view of an annulus or fan component for the rotatable assembly of FIG. 1.

Referring now to the FIGS. 1 and 1a, there is shown generally at 1 a dynamoelectric machine, such as an electric motor, having a stator 2 of stacked metal laminations, and windings 3 are disposed in the stator having an annular grouping of end turns 4 adjacent the opposite ends of faces of the stator. A plurality of beams 5 are contained in stator 2, and the opposite ends of the beam are connected by suitable means, such as disclosed in copending appln. Ser. No. 246,455, with opposite end frames 6 having bearing means 7 therein. A rotatable assembly 8 generally comprises a squirrel-cage rotor 9 having end or short circuiting rings 10, 11 integrally cast or molded on opposite ends of the rotor, as well known in the art, and the mid-portions of a shaft 12 is fixedly disposed in the rotor by suitable means, such as a press or shrink fit or the like. Other components, such as a fan 13 and centrifugal switch 14, may also constitute components of rotatable assembly 8. Rotor 9 is rotatably received in stator 2, and opposite ends of shaft 12 are journaled in bearing means 7 of end frames 6 thereby to rotatably support rotatable assembly in dynamoelectric machine 1 in predetermined spaced relation with the end frames. A pair of retaining clips 15, 16 are predeterminately spaced apart on shaft 12, and thrust washers 17, 18 are adapted to bear against the clips and a part of end frames 6 to maintain the predetermined spaced relation of rotatable assembly 8 with end frames 6. Of course, stator 2, rotatable assembly 8 and end frames 6 may also be disposed in the usual motor housing, as well known in the art.

A plurality of circularly disposed vanes 19 are integrally formed with end ring 11 and extend generally parallel with the axis of rotatable assembly 8. A mounting or locating means, such as a deformable stud 21, is provided on the ends of integral vanes 19 extending therefrom in a direction generally parallel to the axis of rotatable assembly 8, and the studs are predeterminately located generally concentrically about said axis. Seating or locating means, such as a plurality of surfaces or abutments 22, are also provided on the ends of vanes 19 and are predeterminately formed generally perpendicular to the axis of rotatable assembly 11. If desired, each stud 21 may be provided with a conic recession 23 in the distal end thereof which aids deformation of the stud causing it to extrude laterally when force is applied thereto in a direction generally parallel to the rotor axis, as discussed hereinafter.

Figure 4:
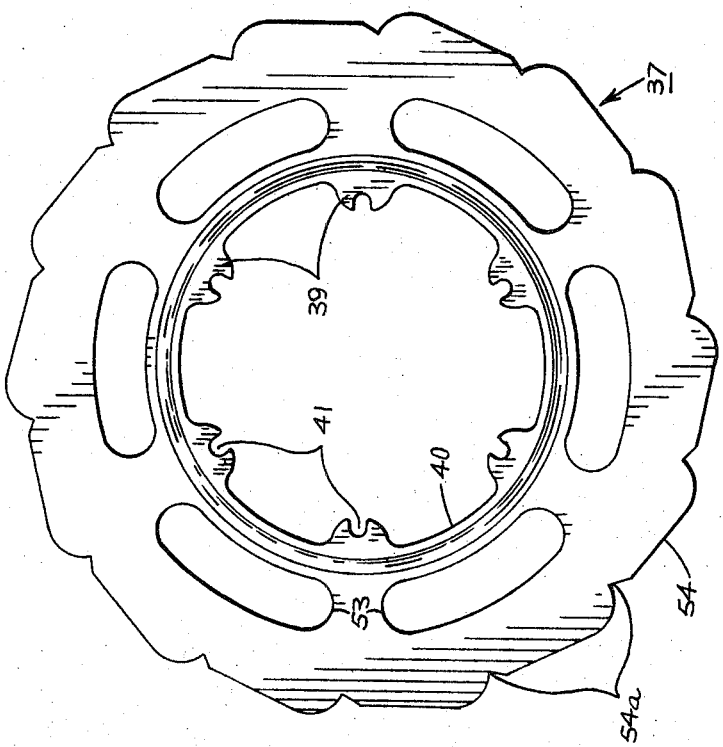
FIG. 4 is a plan view of the fan of FIG. 3 at a later stage of formation.

A generally planar annulus, such as an annular member or fan stamping 37 in the stage of manufacture shown in FIG. 4, is formed from sheet metal material, such as steel or the like, and may be coated or plated, if desired. Stamping 37 is provided with lugs 39 extending generally radially inwardly adjacent the inner peripheral portion or edge 40 thereof, and each lug is provided with a locating or positioning means, such as an opening, aperture, slot or indenture 41 or the like, which are also adjacent to the inner peripheral edge. Openings 41 are predeterminately formed and positioned so as to mate with alternate ones of studs 21, and the portion of lugs 39 adjacent each opening 41 are disposed in seating or locating engagement on locating surfaces 22 or the ends of vanes 19 when stamping 37 is assembled onto rotatable assembly 8. As previously mentioned, studs 21 are predeterminately disposed on vanes 19 generally in concentric relations with the axis of rotatable assembly 8, and openings 41 are predeterminately formed to be received on are mate with the studs in locating engagement therewith; therefore, it may be noted that the concentricities of the inner peripheral portions and inner periperial edge 40 are accurately maintained. Further, since lugs 39 seat on surfaces 22 which are predeterminately perpendicular to the axis of rotatable assembly 8, it may also be noted that the general plane of stamping 37 is normal to said axis upon deformation of studs 21 into displacement preventing or locating engagement with a portion of 39 about openings 41 therein, as discussed in detail hereinafter.

Centrifugal switch device 14, which functions to electrically disengage start windings within stator 2 according to well-known techniques, may be provided with apertures 43 which, in conjunction with studs extending from end ring 10 and not visible in FIG. 1a, allow a centrifugal mechanism 45 to be staked to end ring 10. A flat or key slot 47 is also typically provided on one or both ends of rotor shaft 12 to aid in the attachment of pulleys or other devices. The precise sequence of fabrication and the forming fan 13 will be better understood by considering FIG. 1 in conjunction with a sequence of other FIGURES.

Figure 2:
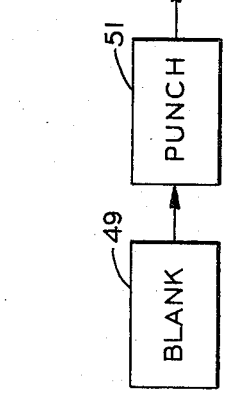
FIG. 2 is a functional flow diagram of a process of assembling the rotatable assembly of FIG. 1 emphasizing the steps relating to the fan; thereof embodied in the present invention.

Considering FIGS. 3, 4, 5 and 6 sequentially in conjunction with the functional block diagram of FIG. 2, blanking 49 and punching 51 indicate that a sheet of relatively thin strip material is passed through one or more presses having sequential dies or a single complex die to blank out a fan blank, punch arcuate or annularly disposed apertures or vents 53 and remove the central portion so as to form annulus or fan stamping 37 having lugs or protrusions 39 and indentures 41. When blanked, an outer peripheral portion or edge 54 of stamping 37 is provided with a plurality of serrations 54a. Slitting operation 55 of FIG. 2 is another (perhaps simultaneous) press operation and indicates that slits 57 of FIG. 4 lying generally in a tangential position about stamping 37 and intersecting with serrations 54a are to be provided to aid in subsequent forming operations. At this point stamping 37 of FIG. 4 is placed on the free ends of vanes 19, as illustrated in FIG. 5, and studs 21 are deformed by staking, as well known in the art, to firmly attach or secure the stamping in locating and displacement preventing engagement to vanes 19, as illustrated. As previously mentioned the coactions between the predeterminately located studs 21 and lug openings 41 and between lugs 39 and vane surfaces 22 is effective to predeterminately maintain concentricity of the inner portions of stamping 37 relative to the axis of rotatable assembly 8 at a minimum.

The exact degree to which rotatable assembly 8 is assembled prior to or subsequent to staking operation 59 is variable as will be more clearly seen in considering FIG. 7; however, for the purposes of the process illustrated in FIG. 2, it is assumed that all of the parts illustrated in FIG. 1 have been assembled prior to the staking operation, as indicated by block 61. The output product from the assemble and staking operation 59 appears as illustrated in FIG. 5.

After staking fan stamping 37 to rotor end ring 11, vanes 63, which are portions of the stamping defined by slits 57, are deformed or bent out of the plane of the stamping generally along imaginary lines emanating radially from the center of the stamping so as to lie generally perpendicular to the plane of the stamping, as illustrated in FIG. 6 and better seen in FIG. 8. As previously noted, fan stamping 37 is predeterminately located on studs 21 of vanes 19 in a manner to obviated or substantially eliminate concentricity between the inner portion or inner peripheral edge 40 of the stamping and the axis of rotatable assembly 8; therefore, it should also be noted that with the rotatable assembly predeterminately located, vanes 63 can be accurately bent away from the plane of the stamping by utilizing the axis of the rotatable assembly as a reference location. In this manner, each of the vanes are spaced equidistantly from the axis of rotatable assembly 8 along the aforementioned imaginary lines emanating radially from the center of stamping 37 through which the axis of rotatable assembly 8 passes; therefore, concentricity between the outer portion and outer peripheral edge 54 and the rotatable assembly is also obviated or substantially eliminated. Of course, the predetermined location of the inner edge or margin 40 about the axis of rotatable assembly 8 and the deformation of vanes 63 from stamping 37 while it is so mounted on rotatable assembly 8 permits the substantial elimination of concentricity between the inner and outer edges 40, 54 of completed fan 13 and rotatable assembly 8. This deformation preferably is a simultaneous action on all of vanes 63, and while the bend line is illustrated as lying along a radial, this feature, as well as the perpendicularity of the vanes to the member, is exemplary only. After forming of vanes 63, as illustrated by step 65 of FIG. 2, which corresponds to the transition from the configuration illustrated in FIG. 5 to that illustrated in FIG. 6, rotor 9 of rotatable assembly 8 is inserted or passed into the bore of stator 2 which has previously had stator windings 3 placed in the slots thereof, as depicted by step 67. In the final assembly of rotatable assembly 8, the ends of shaft 12 are disposed in bearings 7 of end frames 6 thereby rotatably supporting rotor 9 relative to stator 2, as illustrated by step 69 in FIG. 2.

FIG. 7 illustrates a variation on the process illustrated in FIG. 2 wherein like reference numerals illustrate similar steps. In the process of FIG. 7, the fan stamping 37 is staked to an incomplete rotatable assembly 8. For example, end rings 10, 11 and/or shaft 12 may be assembled in the partial rotor assembly step 71, and this incomplete rotor then receives fan stamping 37 during the assemble and stake process 73 after which centrifugal switch 14 is staked to end ring 10, retaining clips 15, 16 attached to the shaft, and thrust collars 17, 18 passed over the shaft. This completion of rotatable assembly 8 is illustrated by block 75, after which fan vanes 63 are formed, as in the previously described process. The degree of completion of rotor assembly 8 prior to the step of staking fan stamping 37 thereto is not critical, nor for that matter, is it critical whether rotor 9 is completely assembled prior to the step of forming vanes 63. For example, vanes 63 might be formed prior to the placement of thrust collars 17, 18 on shaft 12.

FIG. 8 illustrates completed rotatable assembly 8 ready to be rotatably supported within stator 2 in the manner illustrated in FIG. 8. In FIG. 8, deformed studs 77 which function to stake centrifugal switch 14 to end ring 10 are now visible, as is the annular area or chamber between vanes 63 and vanes 19, which annular region accepts stator winding end turns 4 when rotatable assembly 8 is placed within stator 2. Upon rotation of rotatable assembly 8, vanes 19, 63 blow air over end turns 4 providing a desirable cooling effect thereof.

In view of the foregoing, it is apparent that a novel method of making a dynamoelectric machine, a novel method of forming and mounting a fan in a dynamoelectric machine, and a novel method of effecting improved concentricity of a fan in the manufacture of a dynamoelectric machine are provided meeting all of the objects and advantageous features set out hereinbefore, as well as others, and that the arrangement, shapes and details of components embraced by such novel methods, as well as minor variations in the steps thereof, may be made without departing from the spirit and scope of the invention, as set out in the claims which follow.

We claim:

1. A method of forming and mounting a fan for use in cooling an annular group of stator winding end turns in a dynamoelectric machine comprising the steps of:

a. forming in an annulus adjacent the outer edge thereof a plurality of cooling means which remain disposed generally in the plane of said annulus;
  b. securing said annulus to an end ring of a rotatable assembly for said dynamoelectric machine; and then
  c. deforming said cooling means from the plane of said annulus to extend generally over the outer periphery of said annular group of stator winding end turns which may be disposed adjacent said cooling means.

2. The method as set forth in claim 1, wherein said end ring includes a plurality of vanes extending therefrom, and said securing step comprises disposing said annulus on the ends of at least some of said vanes and connecting said annulus therewith against displacement.

3. The method as set forth in claim 2, wherein the deforming step comprises bending said cooling means from the plane of said annulus thereby to form a substantially cylindric chamber bounded by said vanes and said cooling means and into which said substantially annular group of stator winding end turns may be inserted for cooling upon rotation of said vanes and cooling means.

4. The method as set forth in claim 2, comprising the step of forming means adjacent the inner edge of said annulus for connection with said vanes substantially simultaneously with the forming of said cooling means.

5. The method as set forth in claim 1, wherein said forming step comprises serrating the outer edge of said annulus to form a plurality of serrations constituting said cooling means.

6. The method as set forth in claim 5, wherein the deforming step comprises bending said serrations to form a set of vanes projecting from said serrated edge over the outer periphery of said annular group of stator winding end turns and adjacent thereto.

7. The method as set forth in claim 1, comprising the step of forming means adjacent the inner edge of said annulus for securing said annulus to said end ring, the forming of said securing means being substantially at the same time as the forming of said cooling means.

8. The method as set forth in claim 1, comprising the step of forming a set of openings in said annulus between the inner and outer edges thereof through which air is drawn for passage over said annular group of stator winding end turns upon rotation of said cooling means, the forming of said openings being substantially simultaneous with the forming of said cooling means.

9. A method of forming and mounting a fan for cooling stator windings in a dynamoelectric machine comprising the steps of:

a. forming mounting means on an annulus adjacent the inner edge thereof;
  b. mounting said mounting means on deformable means disposed on an end ring of a rotatable assembly;
  c. deforming said deformable means into displacement preventing engagement with said mounting means; and then
  d. forming cooling means on said annulus extending therefrom adjacent the outer edge thereof.

10. The method as set forth in claim 9, wherein said end ring includes a plurality of radially disposed vanes extending therefrom, and said forming step comprises bending said cooling means away from the plane of said annulus into radially spaced and overlaying relation with said vanes.

11. The method as set forth in claim 9, wherein said mounting means includes a plurality of openings, and said mounting step comprises passing said openings over said deformable means.

12. The method as set forth in claim 9, wherein said deformable means include a plurality of studs, and said deforming step comprises staking said studs into displacement preventing engagement with said mounting means.

13. The method as set forth in claim 9, wherein said mounting means includes a set of indentures extending generally radially from the inner edge of said annulus, and said mounting step comprises passing said indentures over said deformable means and positioning said annulus in engagement with at least some portions of said end ring.

14. The method as set forth in claim 13, wherein said deformable means includes a set of deformable studs projecting from the portions of said end ring, and said deforming step comprises staking said deformable studs over the edges of said indentures thereby rigidly securing said annulus on said rotatable assembly.

15. The method as set forth in claim 9, wherein said forming step comprises bending said cooling means away from the plane of said annulus into positions substantially normal thereto.

16. The method as set forth in claim 9, wherein said first forming step comprises serrating the outer edge of said annulus to form a plurality of serrations constituting said cooling means, said serrating being substantially simultaneous with said first forming step.

17. The method as set forth in claim 16, wherein said second forming step comprises bending said serrations relative to said annulus and forming a set of vanes projecting from said serrated edge.

18. A method of making a dynamoelectric machine comprising the steps of:

a. forming a generally flat fan stamping;
  b. mounting said stamping adjacent to one end of an at least partially completed rotatable assembly with the axis thereof extending generally normal to the plane of said stamping;
  c. then deforming at least some portions of said stamping away from the plane thereof;
  d. inserting said rotatable assembly into a bore of a stator; and
  e. supporting said rotatable assembly for rotation in said stator bore.

19. The method as set forth in claim 18, wherein said end of said rotatable assembly includes an end ring having a plurality of vanes extending therefrom, and said mounting step comprises securing said stamping to said vanes.

20. The method as set forth in claim 19, wherein at least some of said vanes include deformable studs projecting therefrom and said stamping includes a set of openings therein, and said mounting step further comprises passing said openings over said studs and deforming said studs into displacement preventing engagement with said stampings about said openings.

21. The method as set forth in claim 18, comprising the intermediate step of completing the assembly of said rotatable assembly subsequent to said mounting step.

22. The method as set forth in claim 21 wherein said completing step comprises securing another component of said rotatable assembly to another end thereof opposite that to which said stamping is mounted.

23. The method as set forth in claim 18, comprising the preliminary step of completing the assembly of the rotatable assembly prior to said mounting step.

24. The method as set forth in claim 18, wherein said forming step comprises further forming a plurality of cooling means adjacent the peripheral edge of said stamping, which cooling means remain disposed generally in the plane of said stamping, said cooling means constituting said portions of said stamping.

25. The method as set forth in claim 24, wherein said deforming step comprises bending said cooling means away from the plane of said stamping.

26. The method as set forth in claim 18, comprising the simultaneous step of forming means on said stamping for mounting engagement with the end of said rotatable assembly, the forming of said mounting means being substantially simultaneous with the forming of said stamping.

27. The method as set forth in claim 18, comprising the simultaneous step of forming a set of annularly disposed openings in said stamping through which air is drawn for cooling windings of said stator upon energization of said dynamoelectric machine.

28. the method as set forth in claim 18, wherein said forming step comprises serrating the peripheral edge of said stamping to form a plurality of serrations constituting said portion of said stamping.

29. The method as set forth in claim 28, wherein said deforming step comprises bending said serrations to form a set of vanes projecting from said serrated edge and angularly disposed relative to the plane of said stamping.

30. The method as set forth in claim 18, wherein said supporting step comprises deposing at least one end frame on said dynamoelectric machine in predetermined spaced relations with said stator and journaling said rotatable member in bearing means provided in said stator.

31. The method as set forth in claim 18, wherein said stator includes means for supporting opposite end frames, and said supporting step comprises journaling said rotatable assembly in bearing means provided in each of said end frames.

32. A method of making a dynamoelectric machine comprising the steps of:
 a. attaching a generally planar member of sheet material to a rotatable assembly for said dynamoelectric machine;
 b. deforming portions of said attached member thereby to form a plurality of vanes extending away from the plane of said member and disposed generally concentrically about the axis of said rotatable assembly; and
 c. supporting said rotatable assembly for rotation within a wound stator.

33. The method as set forth in claim 32, wherein said rotatable assembly includes on an end thereof a plurality of other vanes substantially concentric with said first named vanes, and said attaching step comprises disposing said member on the ends of a set of said other vanes and connecting said member thereto against displacement.

34. The method as set forth in claim 33, wherein the other vanes of said set each include a deformable stud, and said attaching step further comprises passing another portion of said member over said studs and deforming at least some of said studs into displacement preventing engagement with said other portion of said member for rigidly connecting it to said rotatable assembly.

35. The method as set forth in claim 33, wherein said deforming step comprises bending said portions of said member away from the plane thereof to form said first named vanes, said first named vanes and other vanes defining an annular space therebetween for receiving end turns of said wound stator.

36. The method as set forth in claim 32, wherein said rotatable assembly includes an end, and said attaching step comprises staking said member to said end in a position generally normal to the axis of said rotatable member for conjoint rotation therewith.

37. The method as set forth in claim 32, comprising the preliminary step of forming in said member said vanes which remain generally in the plane of said member.

38. The method as set forth in claim 37, wherein said deforming step comprises bending said vanes from the plane of said member.

39. The method as set forth in claim 32, comprising the preliminary step of serrating a peripheral edge of said member to form a plurality of serrations, said serrations constituting said vanes.

40. The method as set forth in claim 39, wherein said deforming step comprises bending from said serrated edge said vanes toward their positions disposed generally concentrically about the axis of said rotatable member.

41. The method as set forth in claim 32, comprising the preliminary step of forming a set of annularly disposed openings in said member through which air is drawn for cooling end turns of said wound stator.

42. The method as set forth in claim 32, wherein said supporting step comprises disposing at least one end frame on said dynamoelectric machine in predetermined spaced relation with said wound stator and journaling said rotatable assembly in bearing means provided in said end frame.

43. In the manufacture of a dynamoelectric machine having a fan attached to and rotatable with a rotatable assembly about its axis in said machine, the method of effecting improved concentricity of said fan about the axis of said rotatable assembly comprising the steps of:

a. locating a generally planar, annular fan member on an end of said rotatable assembly in a located position generally concentric with and perpendicular to said axis thereof;

b. securing said member in its located position to said end of said rotatable assembly; and c. deforming a plurality of fan vanes from the plane of said member adjacent its outer peripheral edge to positions extending generally perpendicular to the plane of said member while said member is in its located position.

44. The method as set forth in claim 43, comprising the intermediate step of locating on the axis of said rotatable assembly for performing the deforming step whereby said fan vanes are substantially equidistant from said axis.

45. The method as set forth in claim 43 comprising the preliminary step of predetermining the located position of said member by disposing on said end of said rotatable assembly a set of locating means generally concentric with said axis and a set of locating surfaces generally perpendicular to said axis.

46. The method as set forth in claim 45, wherein said locating step comprises passing a portion of said member over said locating means into locating engagement therewith and into seating engagement with said locating surfaces.

47. The method as set forth in claim 45, comprising the preliminary step of forming said member with a set of openings adjacent the inner peripheral edge of said member for locating engagement with said locating means.

48. The method as set forth in claim 47, wherein said locating step comprises, passing said set of openings over said set of locating means into locating engagement therewith and sealing said member in said set of locating surfaces thereby disposing said member in its located position.

49. The method as set forth in claim 48, wherein said securing step comprises deforming at least some of said locating means of said set thereof into engagement with said member about at least some of the openings of said set thereof thereby to seat said member on said set of locating surfaces and prevent displacement of said member from said rotatable assembly.

50. The method as set forth in claim 49, wherein said securing step further comprises staking said some of said locating means into engagement with said member.

51. The method as set forth in claim 47, wherein said securing step comprises deforming at least some of said locating means into engagement with said portion of said member thereby to locate said member perpendicularly of said axis.

52. The method as set forth in claim 43, comprising the preliminary step of forming said vanes in said member adjacent its outer peripheral edge with said vanes remaining substantially in the plane of said member.

53. The method as set forth in claim 52, wherein said deforming step comprises bending said vanes from the plane of said member.

54. The method as set forth in claim 43, comprising the preliminary step of serrating the outer peripheral portion of said member and forming therein vanes which remain substantially in the plane of said member.

55. The method as set forth in claim 54, wherein the deforming step comprises bending said vanes from the plane of said member to their respective positions extending generally perpendicular to said plane.

* * * * *